United States Patent [19]

Barkhurst

[11] Patent Number: 4,676,945
[45] Date of Patent: Jun. 30, 1987

[54] FUEL ASSEMBLY INSERTION SYSTEM
[75] Inventor: David J. Barkhurst, Richland, Wash.
[73] Assignee: Exxon Nuclear Company, Inc., Richland, Wash.
[21] Appl. No.: 684,036
[22] Filed: Dec. 20, 1984
[51] Int. Cl.$^4$ ............................................. G21C 19/20
[52] U.S. Cl. ..................................... 376/261; 376/264; 376/272; 403/115
[58] Field of Search ............... 376/264, 268, 260, 272, 376/434, 261; 403/123, 115, 122

[56] References Cited

U.S. PATENT DOCUMENTS

| 2,121,317 | 6/1938 | Cohen | 403/115 |
|---|---|---|---|
| 2,998,368 | 8/1961 | Long | 376/264 |
| 3,291,326 | 12/1966 | Leclere et al. | 376/268 |
| 3,603,634 | 9/1971 | Kumpf | 294/86 |
| 3,728,221 | 4/1973 | Waldis . | |
| 3,801,442 | 4/1974 | Walker et al. . | |
| 3,907,444 | 9/1975 | Arant | 403/122 |
| 4,042,828 | 8/1977 | Rubinstein et al. | 376/272 |
| 4,130,460 | 12/1978 | Iljunin et al. | 376/434 |
| 4,177,386 | 12/1979 | Wachter et al. | 376/272 |
| 4,204,910 | 5/1980 | Koshkin et al. . | |
| 4,317,702 | 3/1982 | Akeret | 376/272 |
| 4,448,744 | 5/1984 | Karger et al. | 376/264 |

FOREIGN PATENT DOCUMENTS

| 1256333 | 12/1967 | Fed. Rep. of Germany | 376/268 |
|---|---|---|---|
| 2007931 | 9/1970 | Fed. Rep. of Germany | 376/268 |
| 1203179 | 1/1960 | France | 376/272 |
| 1105359 | 3/1968 | United Kingdom | 376/264 |
| 2147450 | 5/1985 | United Kingdom | 376/434 |

Primary Examiner—Deborah L. Kyle
Assistant Examiner—Dan Wasil
Attorney, Agent, or Firm—Volker R. Ulbrich; Donald F. Wohlerst; Kenneth R. Schaefer

[57] ABSTRACT

In accordance with the present invention, use is made of the adjacent vertically arranged fuel bundles which surround the empty core position to be filled with the fuel bundle to be inserted. Such use of the adjacent bundles involves the placement upon the top tie plate of each bundle of a separate and individual centering device, each centering device being of a generally box-like cap configuration and engaging the upper tie plate of each fuel bundle. Preferably, each such centering device includes a pair of tapered dowel pins which engage apertures formed in the upper surface of the fuel assembly tie plate so that lateral forces imposed upon the centering device will be transmitted to the upper end of the fuel bundle assembly that may be bowed into the empty core position. Each centering device also preferably includes an elongated handling pole uniquely connected to the top wall of the centering device so that each centering device may be lowered individually onto the upper tie plate of its respective associated fuel bundle. This elongated handling pole engages the top wall of the centering device through a novel ball and socket arrangement which permits the handling of the pole to swing well clear of the fuel insertion operating area after the centering device has been placed on its respective fuel bundle. The unique ball and socket arrangement also allows the centering device to self-align itself on the handling pole when the handling pole is lifted vertically or, alternatively, being lowered down on top of the fuel bundle during installation thereon.

9 Claims, 6 Drawing Figures

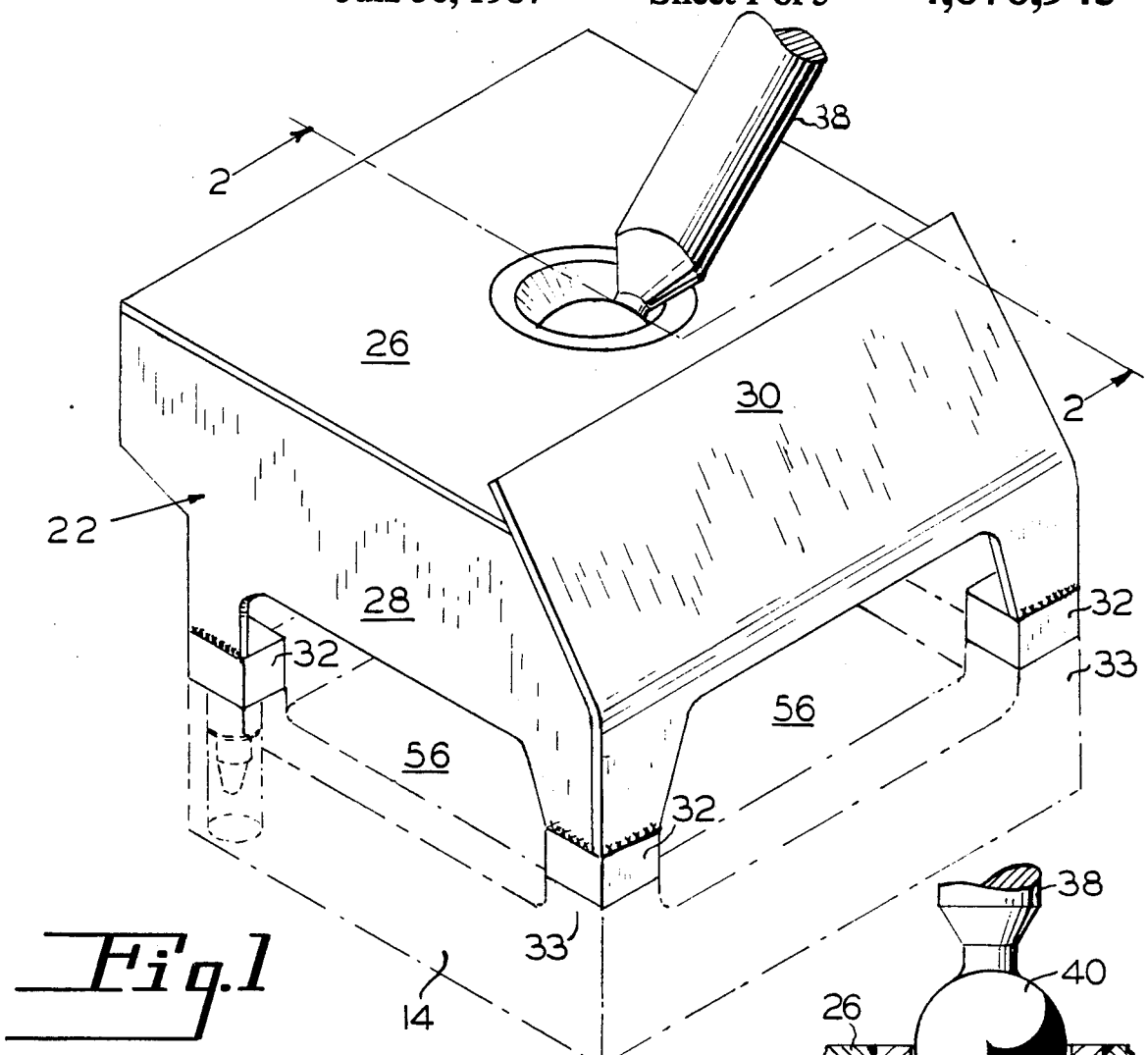
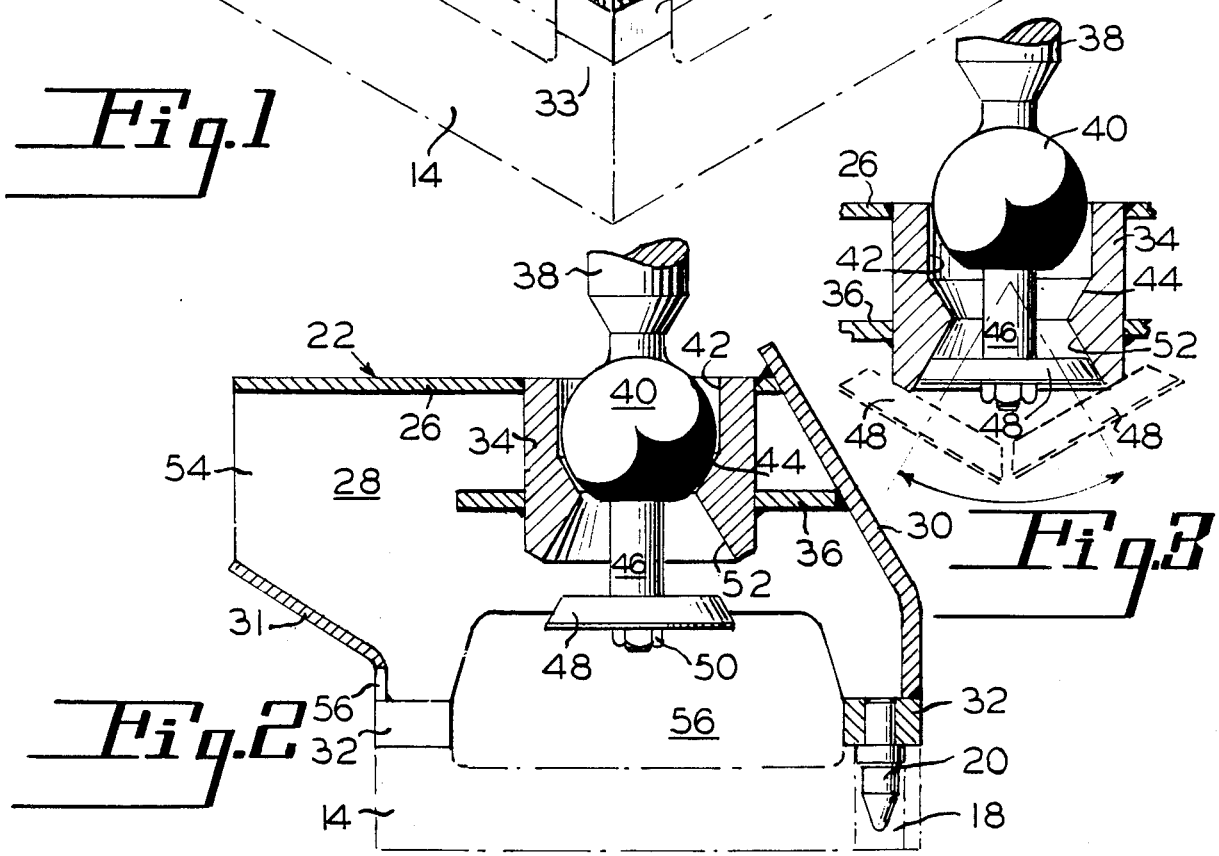
Fig.1
Fig.2
Fig.3

FUEL ASSEMBLY INSERTION SYSTEM

BACKGROUND OF THE INVENTION

The present invention relates to the field of nuclear power reactors which are generally of the pressurized water type. Such nuclear power reactors typically have a plurality of individual elongated and generally vertical fuel bundle assemblies which comprise the reactor core. During refueling of such a reactor core, it is typical to replace one-quarter to one-third of the total number of fuel bundle assemblies at a given time. Typically, such re-fueling of a reactor core is carried out by removing the spent fuel bundles that are to be withdrawn from the reactor core and thereafter repositioning some of the existing fuel bundles to new locations within the core and finally inserting the new fuel bundles into their desired initial position. Typically, such fuel repositioning and management is effected while the reactor core fuel assemblies are sumberged in the cooling fluid within the reactor vessel and various means for accomplishing such repositioning are employed at the top of the reactor vessel. Such means may take the shape of a traveling crane mechanism such as shown in U.S. Pat. No. 3,603,634 or U.S. Pat. No. 4,385,028.

In any event, occasionally some difficulty will be experienced in inserting a fuel bundle assembly into certain reactor core locations due to inadequate physical space to receive the fuel assembly being inserted. This space problem is generally due to a slight elastic bowing in one of the fuel assemblies bordering the core location being loaded. In some cases, the resulting rectangular opening is too small to readily receive the lower end of the fuel bundle assembly being inserted, in spite of there being small chamfers on the lower bottom tie plate of the fuel bundle assembly. When such is the case, a delay of one to two hours is typical to overcome such a problem over the time otherwise required to insert a fuel bundle wherein the empty core position is of the proper dimension to receive the fuel assembly being inserted. Such unnecessary time delay in carrying out the loading and reshuffling of position of the fuel bundle assemblies in the reactor core results in unnecessary out-of-service time for the utility reactor and delay in its subsequent startup. Such delay is at considerable economic cost to the operating utility, since it unnecessarily increases the out-of-service time of the generating facility.

The problem of physical interference upon insertion of a fuel bundle assembly into a reactor core has been addressed in typical prior art patents, such as the aforementioned U.S. Pat. No. 3,603,634. In this patent, the fuel bundle assembly being inserted is lowered down through a tubular centering device which includes a plurality of enlarged lower edge portions which are adapted to physically displace the fuel bundles adjacent the core position being loaded away from the empty core position. While the solution presented by this prior art patent may be applicable to fuel loading operations where the fuel assembly is lowered down through a centering mast or device, it is unsuitable for the environment of applicant's invention wherein a fuel bundle is merely lowered directly into an empty core position.

SUMMARY OF THE INVENTION

In accordance with the present invention, use is made of the adjacent vertically arranged fuel bundles which surround the empty core position to be filled with the fuel bundle to be inserted. Such use of the adjacent bundles involves the placement upon the top tie plate of each bundle of a separate and individual centering device, each centering device being of a generally box-like cap configuration and engaging the upper tie plate of each fuel bundle. Preferably, each such centering device includes a pair of tapered dowel pins which engage aperatures formed in the upper surface of the fuel assembly tie plate so that lateral forces imposed upon the centering device will be transmitted to the upper end of the fuel bundle assembly that may be bowed into the empty core position. Each centering device also preferably includes an elongated handling pole uniquely connected to the top wall of the centering device so that each centering device may be lowered individually onto the upper tie plate of its respective associated fuel bundle. This elongated handling pole engages the top wall of the centering device through a novel ball and socket arrangement which permits the handling pole to swing well clear of the fuel insertion operating area after the centering device has been placed on its respective fuel bundle. The unique ball and socket arrangement also allows the centering device to self-align itself on the handling pole when the handling pole is lifted vertically or, alternatively, being lowered down on top of the fuel bundle during installation thereon.

Each of the centering devices in accordance with the invention includes top and side wall means which cooperate with an inclined rear plate and an inclined front wall portion in a manner to provide a hollow, box-like cap on top of its associated fuel bundle assembly. When each centering device is in engagement to its respective fuel bundle assembly, the front inclined wall of the centering device will be positioned so as to cooperate with the lower end of the fuel bundle assembly being inserted into the empty core position so that contact with said fuel bundle assembly will be effective to laterally deflect the bowed fuel bundle to its proper position and allow easy insertion of the fuel assembly into the empty core position.

Another aspect of applicant's novel overall design for each individual centering device is their ability, even though engaged to the upper tie plate of its respective fuel bundle, to permit reactor core coolant to circulate up through the fuel bundle assembly during installation of the new fuel. This is accomplished by providing each of the side walls and the front and rear plates of the centering device with cut-out portions to provide flow passages for any reactor coolant fluid to exit from the centering device. While ordinarily the vertical flow due to convection of the core fluid will not be great during this shutdown state of the nuclear reactor, there will, nevertheless, be thermal gradients within the reactor core fluid which create vertical convection currents which might otherwise displace the centering device from the tops of their respective fuel bundle assemblies.

Accordingly, it is a principal object of the invention to provide a new and novel centering device arrangement to assist in the loading of fuel bundle assemblies into a reactor core.

A further object of the invention is to provide a fuel bundle centering device design which is simple to construct, rugged in performance, and economical to manufacture.

A still further object of the invention is to provide a new and novel system for the insertion of fuel bundle assemblies into an empty core position of a nuclear reactor employing a plurality of individual and separate centering devices which physically engage the upper surface of the adjacent fuel bundles adjacent the core position to be loaded.

These and other objects and advantages of the invention will become apparent, and the invention will be fully understood from the following description and drawings in which:

BRIEF DESCRIPTION OF THE DRAWINGS

FIG. 1 is a perspective view of a single centering device in accordance with the invention as it would be located on top of the upper tie plate of a fuel bundle assembly;

FIG. 2 is a cross-sectional view taken along line 2—2 of FIG. 1;

FIG. 3 is a detailed view of the handling pole ball and socket connection when said centering device is being raised or lowered under the control of the handling pole;

DETAILED DESCRIPTION OF THE INVENTION

Figure 4:
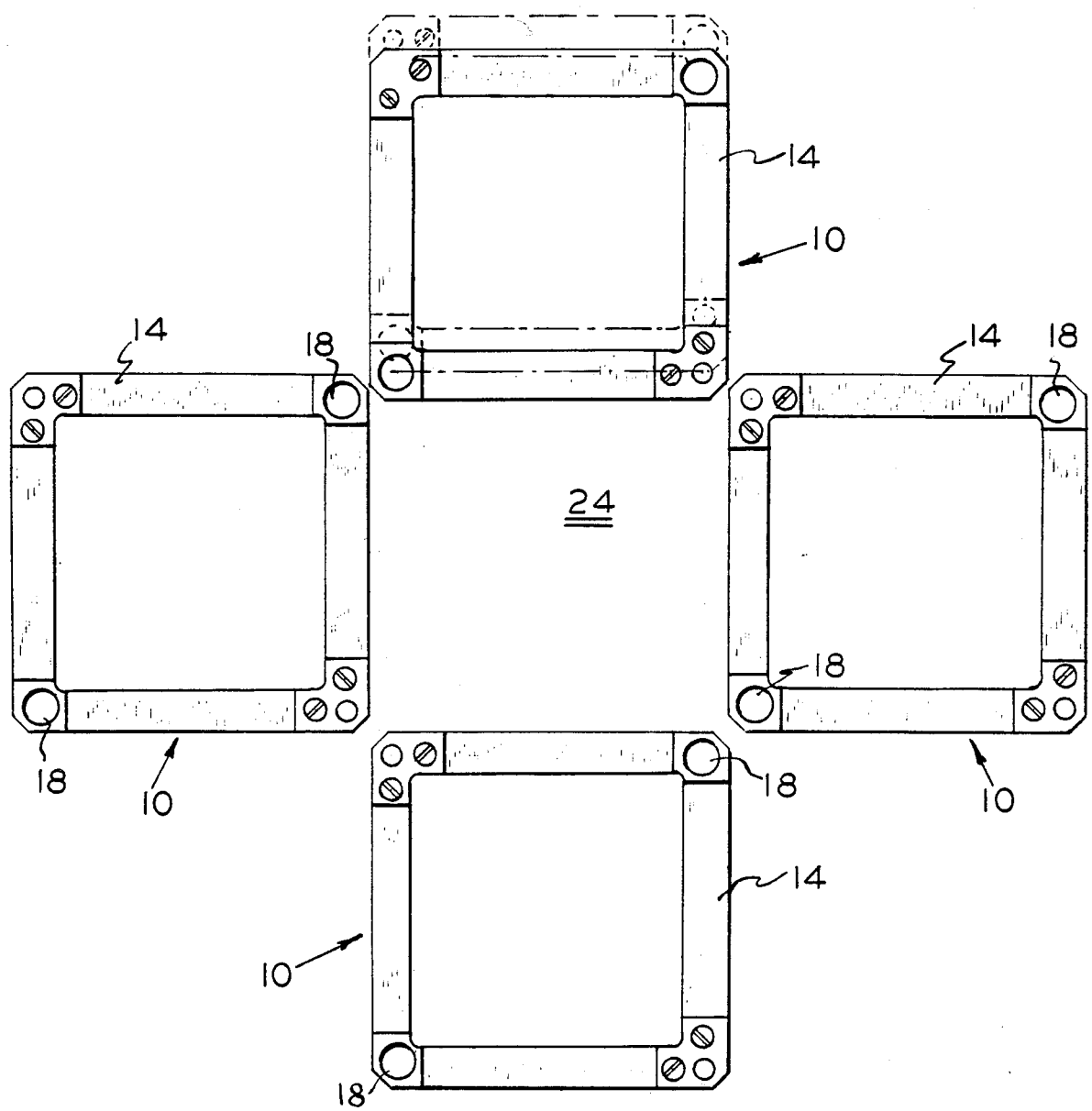
FIG. 4 is a top plan view of the upper tie plates for four fuel bundle assemblies surrounding an empty core position of the reactor into which a fuel bundle assembly is to be inserted.
Figure 5:
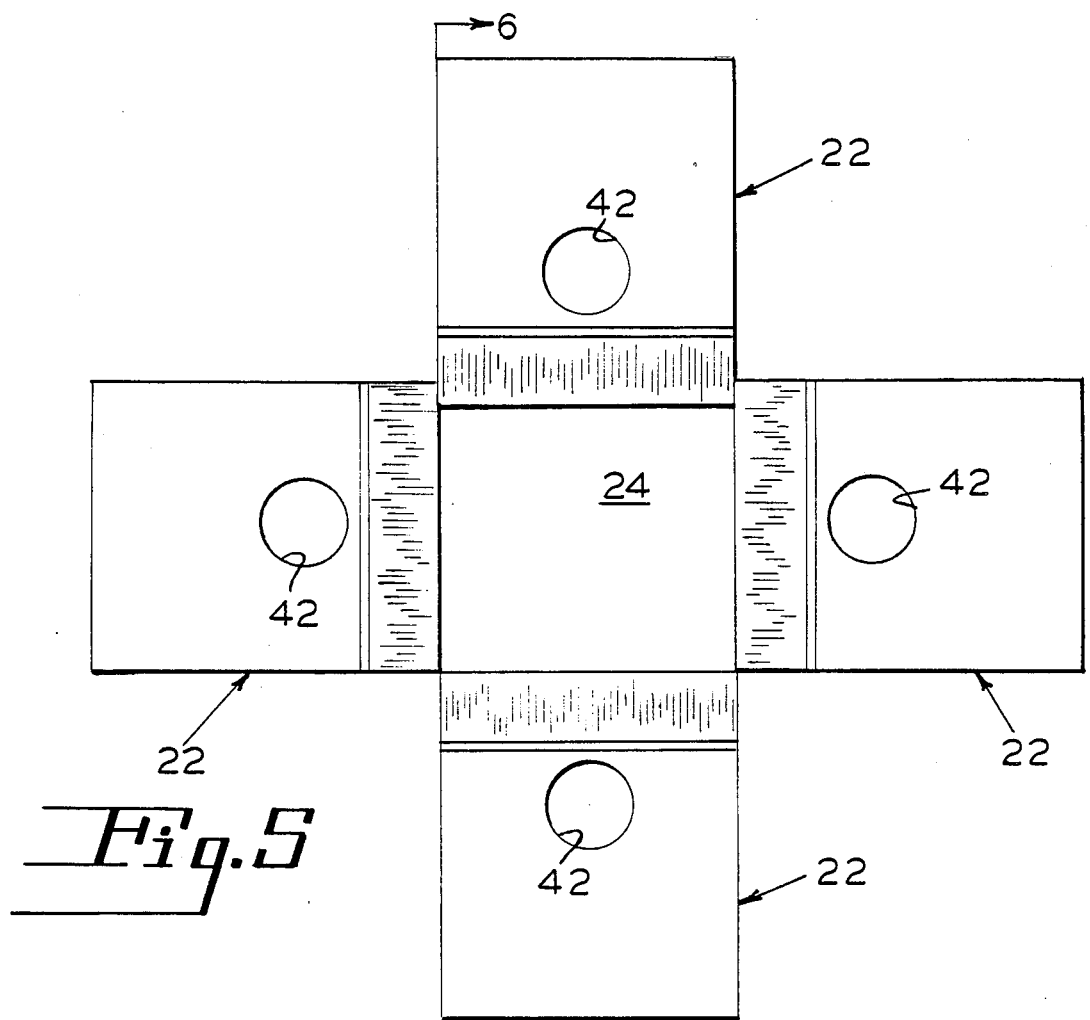
FIG. 5 is a view similar to FIG. 4 wherein four respective centering devices have been installed on top of their associated fuel bundle assemblies.
Figure 6:
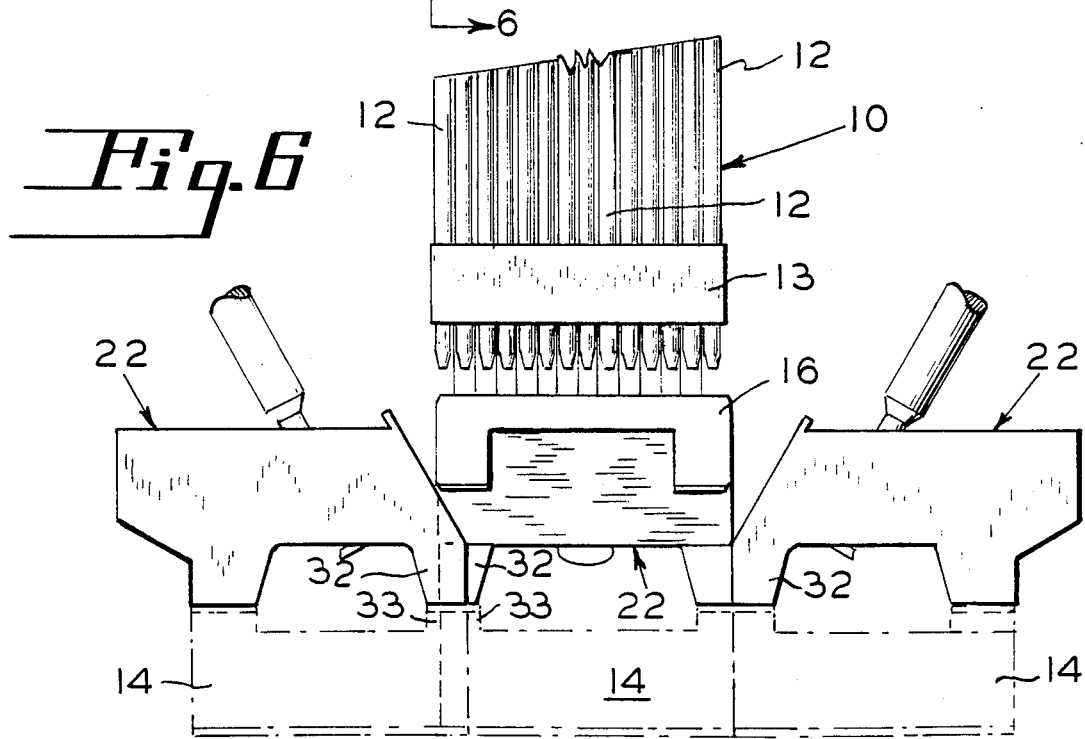
FIG. 6 is a side elevation view of a fuel bundle assembly as it is being lowered into an empty core position of a nuclear fuel reactor.

Referring to the drawings and, in particular to FIGS. 4, 5, and 6, a fuel bundle assembly which may be of the same general type described in U.S. Pat. Nos. 3,379,619 and 3,255,091 and includes a plurality of individual fuel rods 12, a lower grid spacer 13, an upper tie plate 14, and a lower tie plate 16. The upper tie plate 14 will be understood to be connected to the remainder of the fuel bundle assembly therebelow in the conventional manner as typically employed and shown in the aforesaid U.S. patents. Each of the upper tie plates 14 includes a pair of alignment holes or aperatures 18 for receiving a pair of stepped tapered dowel pins 20 disposed on diagonally opposite corners of a centering device generally designated 22. [See FIG. 1] Each of the centering devices 22 disposed on top of its respective fuel bundle upper tie plate 14 includes a top plate 26 and a pair of vertical side walls 28 weldably secured along their upper edges to the undersurface of the top plates 26. Also secured to the top plate 26 is a front inclined or sloping working face 30, while at the opposite end of the side walls 28, is a rear or bottom plate 31 weldably secured to said side walls. At the corner junctures or intersections of these respective side plates 28, working face 30, and bottom plate 31 are attached as by welding four legs or mounting pads 32. Each of the mounting pads 32 is arranged to mount upon four corresponding upstanding shoulders or corners 33 of the upper tie plate 14.

The top plate 26 of each centering device 22 includes a socket 34 welded in an aperature therein and braced by a cross-plate 36 attached to the outer periphery of the socket 34 as well as to the sloping working face 30 and side walls 28. The socket 34 includes a receiving aperature 42 having a conical lower face 44. Disposed within the receiving aperature 42 is the lower end of an elongated handling pole 38 which is provided with a ball 40 to engage the inner diameter of aperature 42. On the underside of the ball 40 is an extending pin member 46 which mounts a chamfer plate 48 secured thereto by a nut 50. It can be seen that the angle on the outer peripheral edge of the chamfer plate 48 is similar to the angle of chamfer on a bottom cone portion 52 formed in the underside of the socket 34.

Referring to FIGS. 1 and 2, it can be seen that the arrangement and cooperation between the box-like centering device 22 as disposed on top of a representative fuel assembly 14 is such as to provide for four lateral side openings 56 defined between the upper edge of the tie plate 14 and the lower arched recess portion of each of the two opposed side walls 28, the inclined working face 30, and the rear bottom plate 31. These side openings 56 are intended to provide free passageway of any reactor core cooling liquid flowing upwardly between the fuel rods 12 that may be present during fuel reloading. Such upward flow could be convection induced or alternatively result from the downward insertion of the fuel assembly 10 displacement of liquid from the empty core space 24. Those skilled in the art will understand that such reloading of a nuclear reactor core is accomplished while all the fuel bundles are submerged in the reactor coolant liquid and that thermal gradients within such cooling liquid will induce convection currents generally flowing upwardly in the liquid in each of the fuel bundles. The presence of the four side openings 56, along with a rectangular opening designated 54 defined between the upper edge of plate 31 and the undersurface of top plate 26, provide a large fluid flow area for any such convection or displacement liquid flowing upwardly within the fuel bundle so that the tendency and force of such fluid will not raise the centering device 22 off the top end of each fuel bundle. In any event, the weight of the handling pole 38 against the surface 44 will ordinarily assist in keeping the centering device 22 well seated on its respective fuel bundle. It should be appreciated that the handling poles may be as long as 20 to 30 feet and that only the lower portion thereof has been shown for drawing convenience herein. However, these handling poles may readily be inclined out of the immediate work area as shown by the position of the chamfer plate 48 in dotted lines in FIG. 3. When the handling pole 38 is in such position the ball 40 will necessarily rest against the conical lower face 34 and the pole 38 will be free to pivot in a conical envelope. Accordingly, it may readily be placed out of the way so that interference with the fuel bundle being loaded into the empty core position 24 and with the fuel loading equipment is avoided.

In operation and in particular with reference to FIG. 6, it may be seen and appreciated that as the fuel assembly loading equipment [not shown] is operated to gradually lower, the assembly 10 into the empty core position 24 that even though one of the fuel bundles 12 is bowed at its upper end to diminish the amount of space for receiving the lower end of the bundle that the lower tie plate 16 of the bundle being lowered is effective to contact the inclined face 30 of the centering device and thereby laterally displace the bowed upper end of the fuel bundle assembly outwardly as the bundle is lowered so that it may readily slide and be inserted into the empty core position 12.

While a specific embodiment of the invention has been shown and described in detail to illustrate the application of the inventive principals, it will be understood that the invention may be embodied otherwise without departing from such principals.

What is claimed is:

1. In a nuclear reactor facility having fuel bundles, a system for the insertion of a fuel bundle into a position wherein a plurality of vertically arranged fuel bundles surround and are adjacent to said position, said system comprising, in combination, a plurality of separate and individual centering devices secured to and disposed on top of each fuel bundle adjacent said position, each such centering device having a generally box-like cap configuration on the upper end of each fuel bundle and including:

a top wall,
first and second side walls, each secured along an upper edge to said top wall,
a rear plate attached along opposite vertical edges to said first and second side walls,
a front inclined wall joined along an upper edge to the top wall and attached along opposite vertical edges to said first and second side walls,
a plurality of pad means secured to the lower edge of said first and second side walls, said front inclined wall and said rear plate for mounting each said centering device on top of an associated fuel bundle,
pin means carried by at least two of said pad means engageable with an associated aperature in said fueld bundle for locating and laterally fixing each said centering device on top of its respective fuel bundle,
each said front inclined wall of each of said centering devices being orientated on top of its respective fuel bundle to slope upwardly and away from the position whereby upon downward insertion of a fuel bundle into said position any contact between the lower end of the fuel bundle being inserted with a front inclined wall of a centering device will laterally deflect the fuel bundle into said position, each said centering device further including central socket means secured to said top wall, and an elongated handling pole means pivotally attached to said socket means.

2. The combination of claim 1 wherein said socket means and pole means are disposed such that said pole means is movable to an inclined position to avoid interference with a fuel bundle being inserted into said position.

3. The combination of claim 2 wherein said socket means includes a downwardly facing conical portion and wherein said pole means includes a pin extension projecting through said socket means and having a chamfer plate attached thereto whereby upon lifting of said centering device by said pole means, said chamfer plate will engage and align with said conical portion.

4. The combination of claim 3 wherein said pin means comprises a pair of conical dowels disposed on diagonally opposite corners of each said centering device.

5. In a nuclear reactor facility having fuel bundles, a system for the insertion of a fuel bundle into a position wherein a plurality of vertically arranged fuel bundles surround and are adjacent to said position, said system comprising a centering device to assist in the insertion of a fuel bundle into an empty position of a nuclear reactor having a plurality of vertically arranged fuel bundles surrounding and adjacent said position, said centering device having a generally box-like cap configuration for placement upon the upper end of a fuel bundle and comprising:

a top wall,
first and second side walls, each secured along an upper edge to said top wall,
a rear plate attached along opposite vertical edges to said first and second side walls and having an upper edge portion spaced from and terminating substantially below said top wall to define a fluid flow passageway therebetween,
a front inclined wall joined along an upper edge to the top wall and attached along opposite vertical edges to said first and second side walls, said inclined wall sloping upwardly and rearwardly toward the rear plate,
a plurality of four pad means secured beneath each of the four vertical edge intersections between said first and second side walls, said front inclined wall and said rear plate for mounting said centering device on top of an associated fuel bundle, and
pin means carried by at least two of said four pad means for engagement with an associated aperature in a fuel bundle for locating and laterally fixing said centering device on top thereof, each said centering device further including central socket means secured to said top wall, and an elongated handling pole means pivotally attached to said socket means.

6. The combination of claim 5 wherein said socket means and pole means are disposed such that said pole means is movable to an inclined position to avoid interference with a fuel bundle being inserted into said position.

7. The combination of claim 6 wherein said socket means includes a downwardly facing conical portion and wherein said pole means includes a pin extension projecting through said socket means and having a chamfer plate attached thereto whereby upon lifting of said centering device by said pole means, said chamfer plate will engage and align with said conical portion.

8. The combination of claim 7 wherein said pin means comprise a pair of conical dowels disposed on diagonally opposite corners of said centering device.

9. The combination of claim 5 wherein a lower edge portion of said first and second side walls, said rear plate and said front inclined wall is arched upwardly toward said top wall to define side fluid flow openings to permit a low resistance escape for any reactor core cooling fluid flowing upwardly through the fuel rods of the fuel bundle below said centering device.

* * * * *